(12) United States Patent
Northrup et al.

(10) Patent No.: US 10,307,959 B2
(45) Date of Patent: Jun. 4, 2019

(54) CONCRETE DELIVERY SYSTEM

(71) Applicant: The United States of America, as represented by the Secretary of the Army, Washington, DC (US)

(72) Inventors: Gerald R. Northrup, Champaign, IL (US); William Jacob Wagner, Champaign, IL (US); Megan A. Kreiger, Champaign, IL (US); Bruce A. MacAllister, Mahomet, IL (US); Michael Patrick Case, Mahomet, IL (US); Ghassan Al-Chaar, Champaign, IL (US)

(73) Assignee: THE UNITED STATES OF AMERICA AS REPRESENTED BY THE SECRETARY OF THE ARMY, Washington, DC (US)

( * ) Notice: Subject to any disclaimer, the term of this patent is extended or adjusted under 35 U.S.C. 154(b) by 107 days.

(21) Appl. No.: 15/280,967

(22) Filed: Sep. 29, 2016

(65) Prior Publication Data
US 2018/0086008 A1   Mar. 29, 2018

(51) Int. Cl.
| | |
|---|---|
| *B28B 1/00* | (2006.01) |
| *B29C 67/00* | (2017.01) |
| *B29C 64/165* | (2017.01) |
| *B33Y 30/00* | (2015.01) |
| *B29C 64/209* | (2017.01) |
| *E04G 21/00* | (2006.01) |
| *B29C 64/343* | (2017.01) |
| *B29C 64/321* | (2017.01) |

(52) U.S. Cl.
CPC ............ *B29C 64/165* (2017.08); *B28B 1/001* (2013.01); *B29C 64/209* (2017.08); *B29C 64/321* (2017.08); *B29C 64/343* (2017.08); *B33Y 30/00* (2014.12); *E04G 21/00* (2013.01)

(58) Field of Classification Search
CPC ..... B28B 1/001; B29C 64/205; B29C 64/209; B29C 64/321; B29C 64/343; E04G 21/00
See application file for complete search history.

(56) References Cited

U.S. PATENT DOCUMENTS 6,030,199 A * 2/2000 Tseng ...................... B29C 41/12
   425/132
7,153,454 B2 * 12/2006 Khoshnevis .......... B29C 64/106
   264/34

(Continued)

*Primary Examiner* — James P Mackey
(74) *Attorney, Agent, or Firm* — Brian C. Jones (57) ABSTRACT

The present invention is a three-dimensional printing system which is capable of printing with multiple different printing materials, including homogenous materials, such as cement paste, or heterogeneous materials, such as concrete. Functionality is accomplished by novel, critical structures including but not limited to a movable gate capable of controlling the flow of printing materials without clogging or becoming otherwise damaged. The system has a print head that discharges printing material through a discharge aperture. The movable gate is rotatably connected to the print head, allowing it to cover the discharge aperture and cut off the flow of printing material when actuated and rotated into position. Certain embodiments also include hose positioning systems to prevent hoses delivering printing material from disconnecting or damaging the printed structure.

9 Claims, 7 Drawing Sheets

(56) References Cited

U.S. PATENT DOCUMENTS

| | | | |
|---|---|---|---|
| 7,641,461 B2* | 1/2010 | Khoshnevis | B29C 64/106 249/20 |
| 7,814,937 B2* | 10/2010 | Khoshnevis | B66C 5/00 137/615 |
| 8,029,710 B2* | 10/2011 | Khoshnevis | B05B 13/04 105/163.1 |
| 2016/0361834 A1* | 12/2016 | Chen-Iun-Tai | B28B 1/001 |
| 2017/0350115 A1* | 12/2017 | Rocher | E04B 1/3505 |

* cited by examiner

CONCRETE DELIVERY SYSTEM

STATEMENT REGARDING FEDERALLY SPONSORED RESEARCH OR DEVELOPMENT

The invention described herein was made by an employee of the United States Government and may be manufactured and used by the Government of the United States of America for governmental purposes without the payment of any royalties thereon or therefore.

CROSS-REFERENCE TO RELATED APPLICATIONS

This application is a continuation-in-part and claims the benefit of U.S. patent application Ser. No. 15/249,739 filed Aug. 29, 2016. The above application is incorporated by reference herein in its entirety.

FIELD OF INVENTION

This invention relates to the field of three-dimensional printing apparatuses for building construction and more specifically to a system for delivering concrete for printed construction of concrete buildings and building components.

BACKGROUND OF THE INVENTION

Three-dimensional printing methods are known in the art and have been successfully used to rapidly construct buildings. For example, Behrokh Khoshnevis of the University of Southern California Information Sciences Institute (in the Viterbi School of Engineering) has developed a printing method that uses a computer-controlled crane or gantry to rapidly construct buildings by deposition of printed cement paste layers. NASA has evaluated this technology for the construction of structures that can be constructed primarily from lunar material.

Current three dimensional printing methods known in the art for rapid construction of buildings utilize computer-controlled gantry systems which move a print head back and forth to fabricate buildings layer by layer. For example, U.S. Pat. No. 7,641,461 disclosed an invention which utilized movement of a print head while discharging printing layers to fabricate a structure. U.S. Pat. No. 8,029,710 further disclosed an invention which utilized a moveable print head to fabricate a structure.

Unfortunately, the above three dimensional printing systems cannot fully utilize advances in printing materials, such as the use of concrete. Concrete is a material that does not have a uniform consistency and which derives its strength, in part, from stones and other aggregate material. Existing spray systems for printing materials are easily clogged because they were designed for discharging a paste having a uniform consistency, such as cement paste.

These systems use a nozzle with an internal valve structure to control the flow of cement paste through an aperture for deposit. However, this valve can easily clog when using material which contains aggregate, such as concrete. Merely increasing the valve and aperture size would require a higher velocity flow and greater pumping volume. The increased volume and rate of flow make it difficult to control and precisely distribute material, thus increasing waste and loss of precision in the fabrication process. This also requires increased size and weight of actuators to move the system, which in turn reduces the system's ability to accurately position the nozzle.

The higher pressures required to expel concrete, as opposed to cement paste, can also damage these print heads and their connected hoses. Furthermore, uncontrolled movement of the heavy delivery hose can cause damage to the printed structure, or cause the hose to detach from the print head, requiring extensive cleanup and repair. This may also decrease printing accuracy due to forces exerted on various parts of the system, which can pull them out of alignment.

There is an unmet need for three dimensional printing systems for buildings which can successfully accommodate the consistency of concrete without compromising the level of precision that can be achieved in the fabrication process.

BRIEF SUMMARY OF THE INVENTION

The present invention is a three-dimensional printing system which is capable of printing with multiple different printing materials, including homogenous materials, such as cement paste, or heterogeneous materials, such as concrete. Functionality is accomplished by novel, critical structures including but not limited to a movable gate capable of controlling the flow of printing materials without clogging or becoming otherwise damaged.

The system has a print head that discharges printing material through a discharge aperture. The movable gate is rotatably connected to the print head, allowing it to cover the discharge aperture and cut off the flow of printing material when actuated and rotated into position. Certain embodiments also include a trowel on the movable gate, allowing manipulation of discharged printing material. Other embodiments also include hose positioning systems to prevent hoses delivering printing material from disconnecting or damaging the printed structure.

TERMS OF ART

As used herein, the term "actuator" refers to any mechanical component capable of initiating or actuating movement of another component by motorized or non-motorized means.

As used herein, the term "assembly" refers to two or more interactive component parts.

As used herein, the term "block" refers to shutting off flow or creating a physical barrier which prevents or reduces flow discharge.

As used herein, the term "elliptical" refers to a rounded shape having a major axis and minor axis, where the major axis is longer than the minor axis.

As used herein, the term "externally actuated" refers to actuated movement of at least a first component that is located externally to at least a second component.

As used herein, the term "gate" refers to a barrier to flow.

As used herein, the term "hose" refers to a flexible tube conveying a flowable material.

As used herein, the term "movable" refers to a component capable of being changed in position, whether axial, rotational, relative to a point, or linear.

As used herein, the term "operatively coupled" refers to a component combined with one or more additional components to perform an identified function.

As used herein, the term "plate" refers to a thin sheet or strip of material.

As used herein, the term "print head" refers to any apparatus used to discharge printing material for distribution on or as a structure or surface.

As used herein, the term "printing material" refers to material expelled from a print head to create an object.

As used herein, the term "pump" refers to a device which moves liquids.

As used herein, the term "reel" refers to a cylinder on which flexible materials can be wound.

As used herein, the term "rheology sensor" refers to a sensor capable of sensing the flow properties of liquids.

As used herein, the term "roller" refers to a disk or cylinder that rotates around a central axis.

As used herein, the term "rotatable" refers to axial and arc shaped movements, or any movement relative to a point representing a center or central axis.

As used herein, the term "selectively positioned" refers to having a position which can be selected or controlled.

As used herein, the term "torsional spring" refers to an elastic object that stores mechanical energy when it is twisted.

DETAILED DESCRIPTION OF THE INVENTION

Figure 1A:
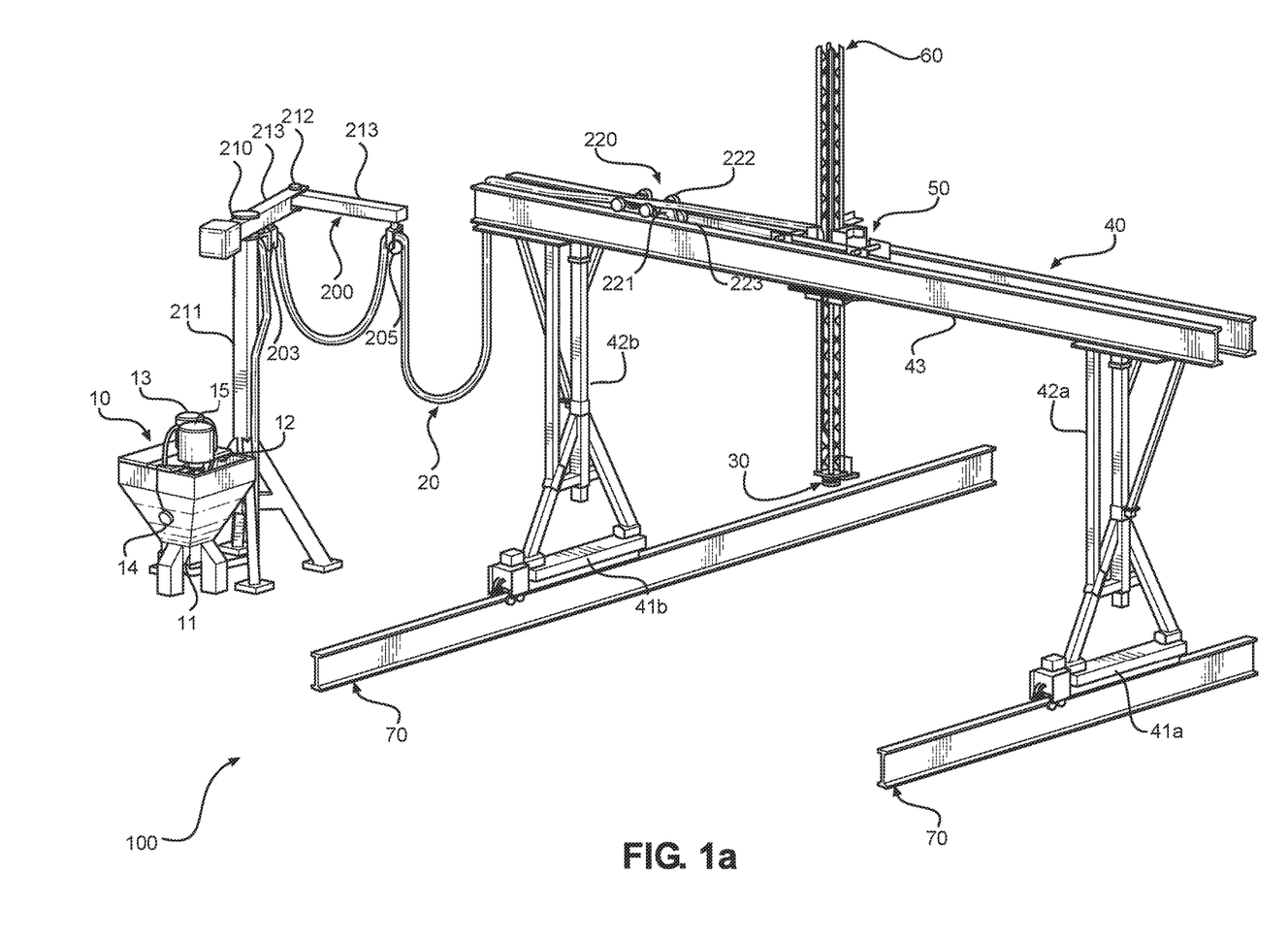
FIG. 1a illustrates a perspective view of an exemplary embodiment of a three-dimensional printing system.

FIG. 1a illustrates a perspective view of an exemplary embodiment of three-dimensional printing system 100. System 100 includes a pump assembly 10, a hose 20, a print head assembly 30, and hose management assembly 200. Pump assembly 10 mixes a printing material, then pumps the composition through hose 20 and expels the composition through print head assembly 30. Various embodiments of hose management assembly 200 provide support and guidance for hose 20 as hose 20 extends from pump assembly 10 along a gantry assembly 40, to a printing trolley 50, and along printing column 60, to which is mounted print head assembly 30.

Pump assembly 10 includes a printing material pump 11 for mixing and pumping the printing material and a rheology sensor 12 for measuring the viscosity of the printing material. If the composition's viscosity is too high, a thinning agent, such as, but not limited to, water or a plasticizer, may be added from a liquid reservoir 13 of pump assembly 10 before the composition enters hose 20. An optional vibration source 14 of pump assembly 10 may vibrate the composition to remove trapped air and keep air pockets from forming, as well as ensure a constant feed. An optional pump cleaner 15 may direct pressurized water or other solvents to clean various areas of pump assembly 10.

Hose 20 attaches at a proximal end to pump assembly 10 and at a distal end to print head assembly 30. Optionally, hose 20 has an elliptical cross-section. As compared to a hose 20 having a circular cross-section with the same area, stiffness of the elliptical hose 20 is lower along the major axis and higher along the minor axis. This imparts greater flexibility and therefore a lower minimum bend radius for hose 20, as well as preventing aggregate from bridging or clumping. An elliptical cross-section also allows for more compact management of hose 20 and increases the stability of hose 20 in motion, reducing the amount of support required for hose 20.

Figure 1B:
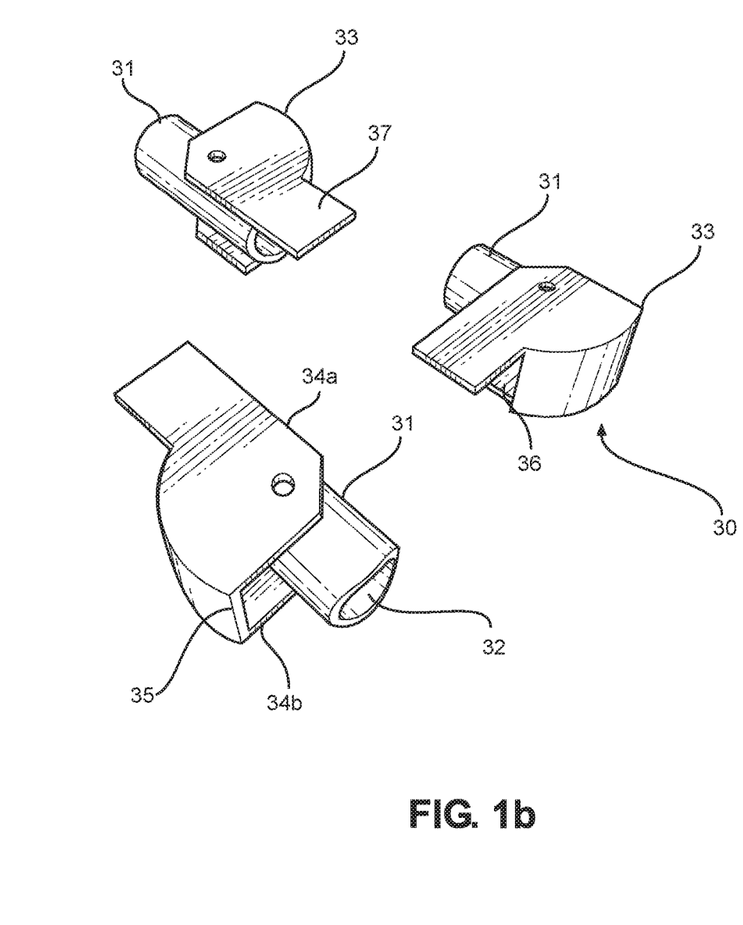
FIGS. 1b and 1c show close-up views of various embodiments of a print head assembly.
Figure 1C:
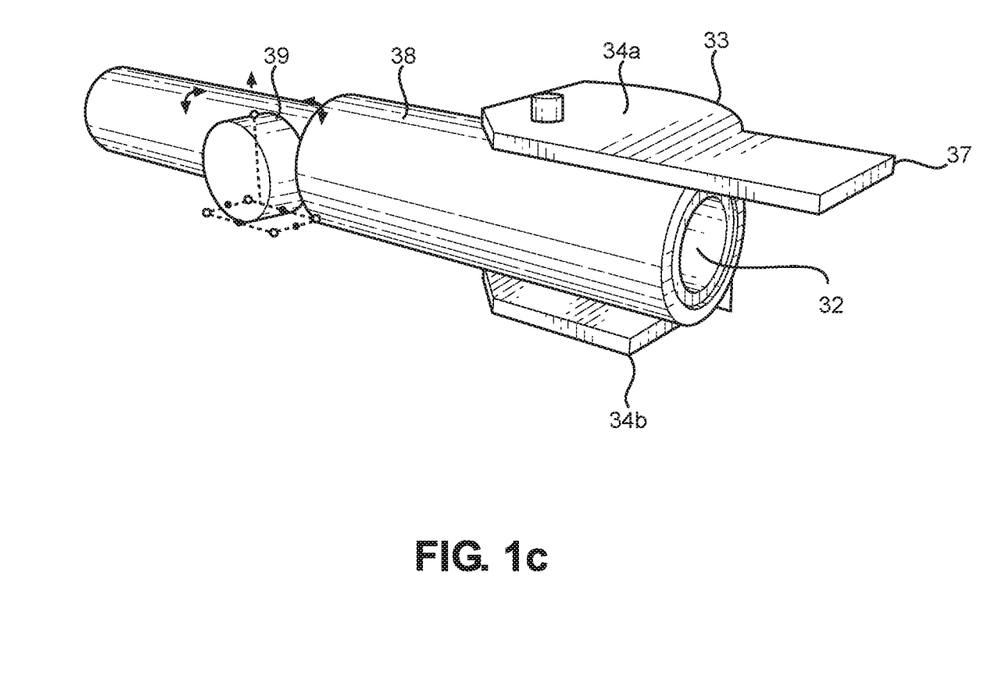

FIGS. 1b and 1c show close-up views of various embodiments of print head assembly 30. Print head assembly 30 controls discharge of the printing material. Print head 31 attaches to the distal end of hose 20 and includes a discharge aperture 32 for expulsion of the composition. Moveable gate 33 is rotatably mounted to print head 31. Selectively actuating and positioning movable gate 33 over discharge aperture 32 cuts off the flow of printing material by blocking discharge aperture 32.

Certain embodiments may use an L-shaped movable gate 33 having one mounting plate 34a attached perpendicularly to base plate 35. Mounting plate 34a may attach integrally to base plate 35. Another embodiment contemplates a U-shaped movable gate 33 having parallel mounting plates 34a and 34b connected by base plate 35. Still other embodiments further interconnect parallel mounting plates 34a and 34b with a backplate. Mounting plates 34a and 34b are externally actuated to position movable gate 33.

In the exemplary embodiment shown in FIGS. 1b and 1c, movable gate 33 is made up of two flat quarter-circle mounting plates 34a and 34b partially attached along their rounded edges by at least one curved base plate 35. Optionally, the portion between the rounded edges which are not attached forms a gate aperture 36 through which print head 31 may discharge the composition. Because movable gate 33 is pivotably connected to first and second side surfaces of print head 31 by first and second mounting plates 34a and 34b, respectively, movable gate 33 may be rotated to cover discharge aperture 32 with curved base plate 35, thereby stopping flow of the composition.

In certain embodiments, at least one of mounting plates 34a and 34b may have a trowel extension 37 projecting beyond gate aperture 36. Trowel extension 37 is a planar projection used to smooth and shape the printing material once it is applied. In certain embodiments, print head assembly 30 also includes a sleeve 38 connected to a sleeve actuator 39. Sleeve 38 is interposed between print head 31 and movable gate 33. In certain embodiments, sleeve 38 connects to print head 31 via a bearing and bushing configuration or multiple bearings. Sleeve actuator 39 rotates sleeve 38 (and correspondingly, movable gate 33) about print head 31, allowing system 100 to move trowel extension 37 into position without having to move all of print head assembly 30.

Figure 2A:
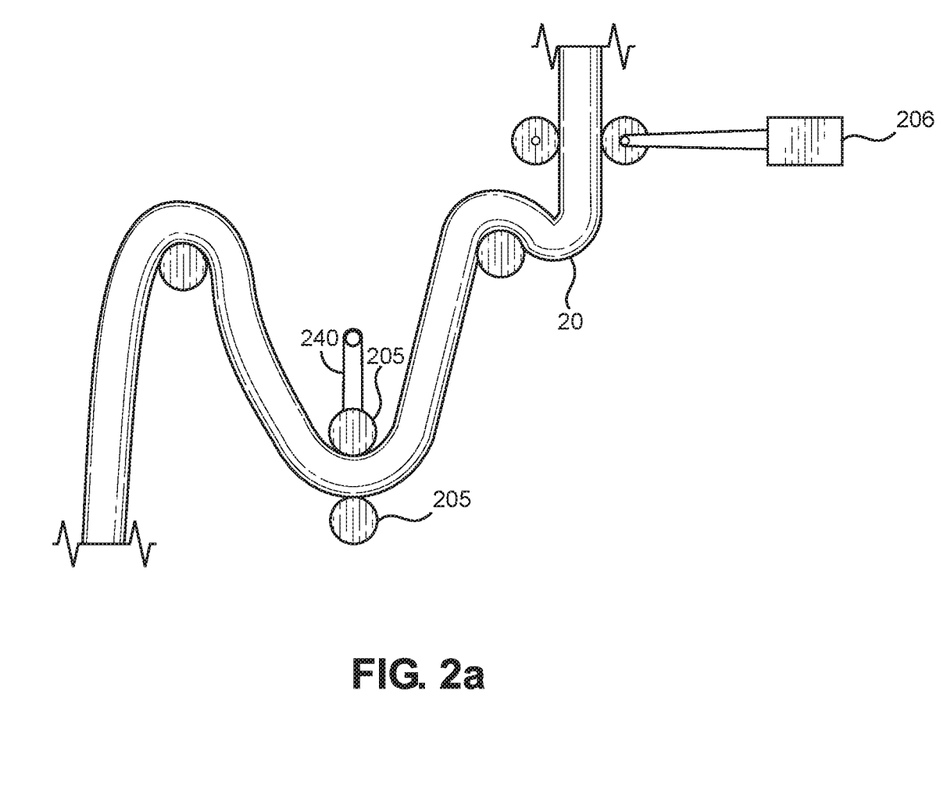
FIGS. 2a-2d illustrate perspective views of embodiments of a hose management assembly.
Figure 2B:
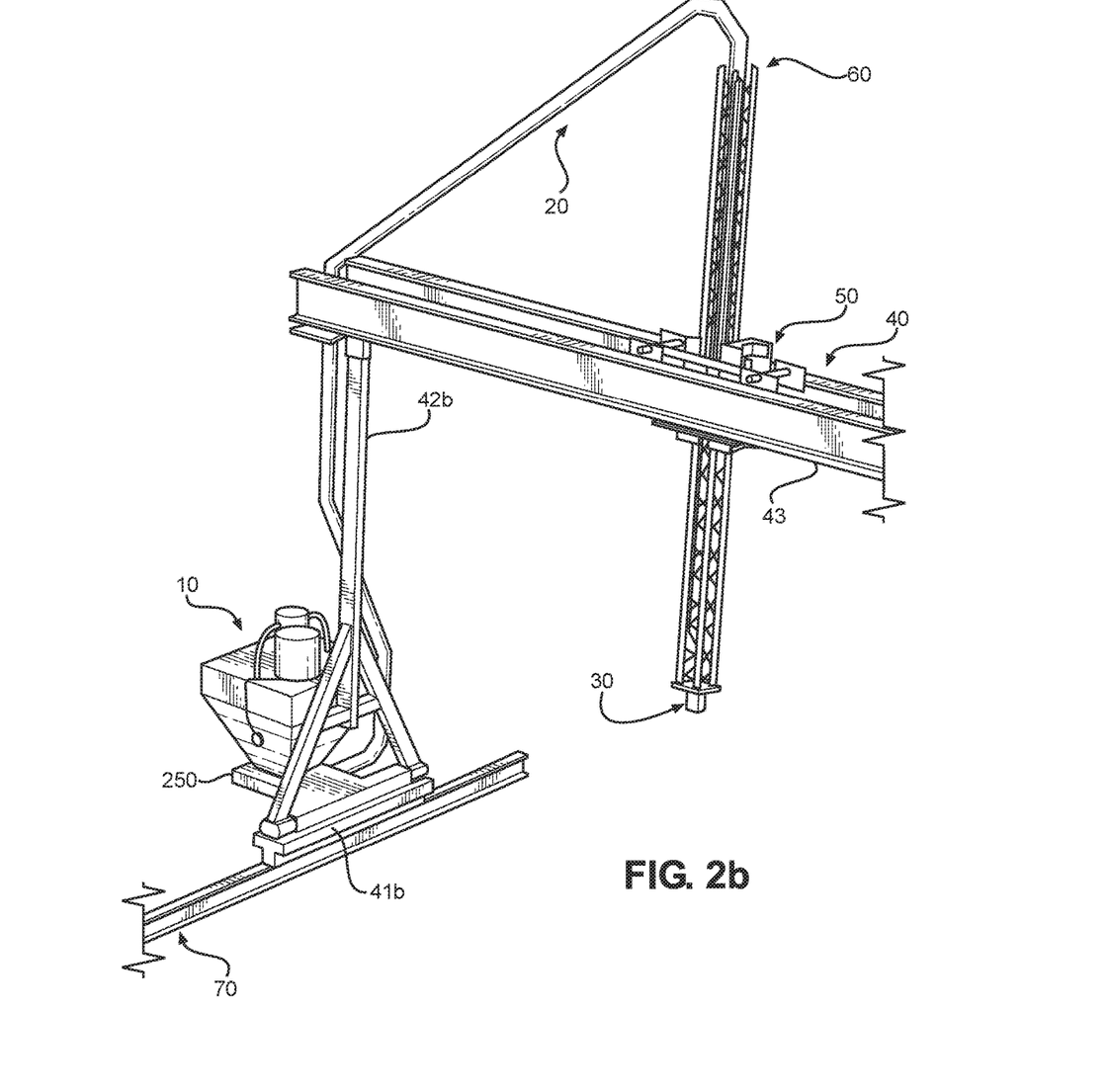
Figure 2C:
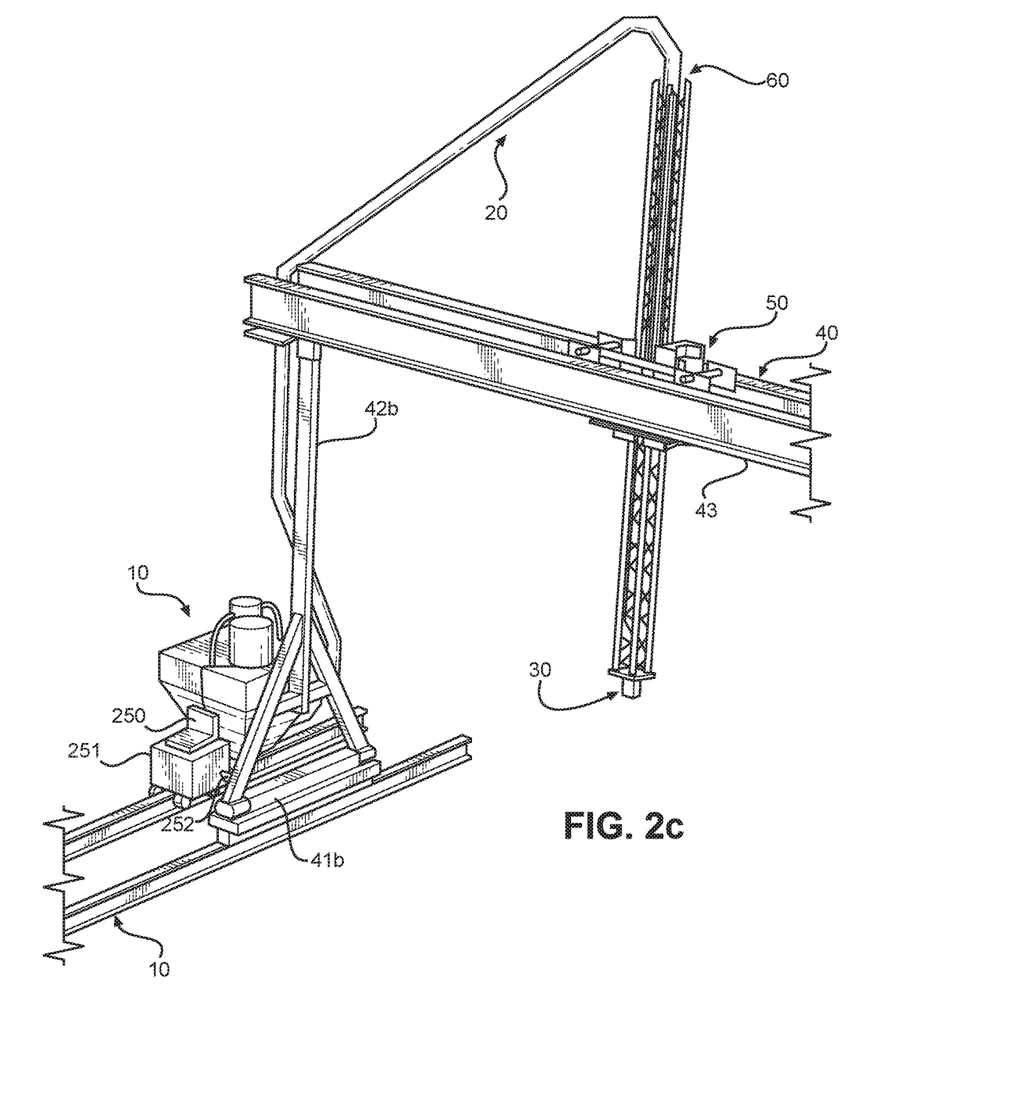
Figure 2D:
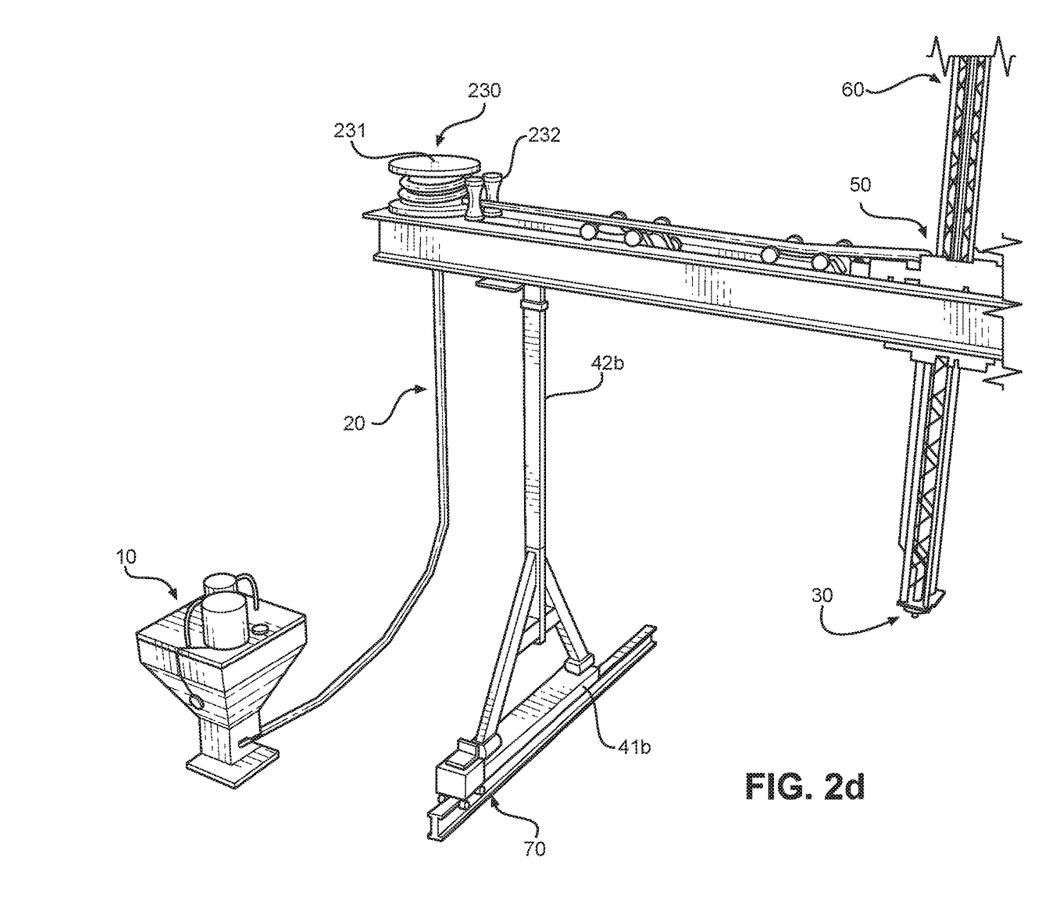

FIGS. 1a and 2b-2d illustrate perspective views of embodiments of hose positioning assembly 200. While FIG. 1a shows an embodiment with a hose crane 210 and at least one hose trolley 220, FIG. 2a shows an embodiment with hose rollers 205, FIGS. 2b and 2c show embodiments with a pump platform 250, and FIG. 2d shows an embodiment with a hose reel 230, it should be understood that these embodiments may be combined in various permutations. For example, hose trolley 220 of FIG. 1a might be used in combination with hose reel 230 of FIG. 2d or hose rollers 205 of FIG. 2a. In any embodiment, hose positioning assembly 200 provides support and guidance for hose 20 and/or pump assembly 10 during movement of gantry assembly 40, printing trolley 50, and printing column 60.

Hose crane 210 includes hose crane column 211, which supports hose crane arm 212. Hose crane arm 212 may pivot with respect to hose crane column 211, allowing hose crane arm 212 to follow the longitudinal movement of gantry assembly 40. In certain embodiments, hose crane arm 212 may comprise multiple pivotally connected segments 213. In the exemplary embodiment, a hose roller 205 allows smooth extension and retraction of hose 20 at a distal end of hose crane arm 212. In other embodiments, a hose clamp 203 at a distal end of hose crane arm 212 may hold hose 20 in place.

At least one hose trolley 220 rolls in a transverse atop gantry bridge 43. Hose trolley frame 221 connects hose trolley wheels 222, which contact gantry bridge 43, with hose roller 205, which supports and allows smooth transverse movement of hose 20. In certain embodiments, at least one trolley spacer 224 connects at least one hose trolley 220 to printing trolley 50 to ensure that a predetermined distance range is maintained between trolleys. In embodiments using multiple hose trolleys 220, trolley spacers 224 may also interconnect and provide proper spacing between multiple hose trolleys 220. Trolley spacers 224 may be rigid or flexible, such as, but not limited to, sections of rods, chains, or cables.

Hose reel 230 may be attached to a gantry leg, a fixed position along gantry bridge 43, or to printing trolley 50. The diameter of hose reel 230 will be dependent on the bend radius of hose 20, the span and height of gantry assembly 40, and the desired maximum number of windings of hose 20 around hose reel 230 when gantry assembly 40 is positioned at a point as to maximize the slack in the hose. Hose reel 230 may utilize multiple slack control mechanisms 231 to prevent excess slack in hose 20. Hose reel 230 may utilize a torsional spring to passively collect and release the hose slack as gantry assembly 40 moves. Hose reel 230 may also be motorized to allow control of the angular position of hose reel 230 in accordance with the position of gantry assembly 40. In other embodiments, a motor may control the torque applied to hose reel 230 so as to keep a constant tension in hose 20 and ensure that slack is controlled.

As hose reel 230 is designed to rotate in order to pick up excess in hose 20, a reel inlet 232 of hose reel 230 from printing material pump 11 must allow for rotation. This is accomplished through the use of a swivel joint style coupling at reel inlet 232. Swivel joints allow for the rotation of hose 20 and hose reel 230, while still enabling the flow of material through hose 20.

A plurality of hose rollers 205 are located on a gantry leg 42a or 42b such that hose 20 runs over hose rollers 205. In certain embodiments, hose 20 also runs between at least one pair of hose rollers 205 to ensure solid contact between hose rollers 205 and hose 20, effectively squeezing hose 20 between two hose rollers 205. The distance between hose rollers 205 allows hose 20 to festoon gantry leg 42b as hose management assembly 200 takes in slack. Hose management assembly 200 may take in this slack by relying on the motion of printing trolley 50 and printing column 60 to either push or pull hose 20 through hose rollers 205.

In certain embodiments, at least one hose roller 205 is mounted to a tensioning arm 240 with a spring bias. This exerts tension on hose 20 to pull in excess. Tensioning arm 240 may be allowed to rotate about an axis perpendicular to the direction that hose 20 is draped or may slide or roll in a vertical direction. In other embodiments, hose management assembly 200 may be actively managed by driving at least one hose roller 205 with a roller actuator 206. Roller actuator 206 may be controlled by either coordinating the rotation of hose roller 205 with movement of gantry assembly 40, or by controlling the torque imparted to hose roller 205, effectively controlling the tension in hose 20. In the exemplary embodiment, roller actuator is a motor.

Pump platform 250 is a vertical or horizontal surface supporting pump assembly 10, which allows pump assembly 10 to travel with gantry assembly 40. In one embodiment, pump platform 250 extends directly from gantry assembly 40. In another embodiment, pump platform 250 is connected to a pump tractor 251 which moves pump platform 250 along the same runway assembly 70 as gantry assembly 40, or along a runway assembly 70 parallel to the one supporting gantry assembly 40. Hose 20 runs from pump assembly 10 up gantry leg 42a or 42b. The motion of pump platform 250 along runway assembly 70 is coordinated with the motion of gantry assembly 40.

In one embodiment, movement of gantry assembly 40 and pump platform 250 is not entirely synchronized, because hose 20 is flexible and allows for some variation between the respective positions. In one embodiment, pump platform 250 can move incrementally along the same or a second runway assembly 70 when slack in hose 20 is taken up by movement of gantry assembly 40. Platform switches 252 attached to gantry leg 42a or 42b trip when slack in hose 20 is taken up. Tripping of one of platform switches 252 activates pump tractor 251 to move pump platform 250 a predetermined distance. In another embodiment, the position of pump platform 250 could be controlled by intercepting position commands for gantry assembly 40 and filtering the commanded position to smooth out the positioning of pump platform 250. Partially synchronous movement between gantry assembly 40 and pump platform 250 may reduce the amount of wear on pump tractor 251, and would also reduce power consumption and reduce vibrations in gantry assembly 40 due to rapidly accelerating and decelerating the mass of the pump.

It will be understood that many additional changes in the details, materials, procedures and arrangement of parts, which have been herein described and illustrated to explain the nature of the invention, may be made by those skilled in the art within the principle and scope of the invention as expressed in the appended claims. Moreover, the terms "substantially" or "approximately" as used herein may be applied to modify any quantitative representation that could permissibly vary without resulting in a change in the basic function to which it is related.

It should be further understood that the drawings are not necessarily to scale; instead, emphasis has been placed upon illustrating the principles of the invention.

What is claimed is:

1. A three dimensional printing system, comprised of: a print head having a discharge aperture for discharge of printing material; a movable gate positionable over said discharge aperture, wherein said moveable gate is externally actuated and selectively positioned to block discharge of said printing material from said discharge aperture when positioned over said discharge aperture, wherein said movable gate includes at least one base plate substantially perpendicularly affixed to at least one externally actuated mounting plate that is rotatably mounted to said print head.

2. The system of claim 1, wherein said at least one externally actuated mounting plate is comprised of a first mounting plate connected to a first side surface of said print head and a second mounting plate connected to a second side surface of said print head, wherein said at least one base plate connects said first mounting plate and said second mounting plate.

3. The system of claim 2, wherein said first mounting plate and said second mounting plate are substantially parallel.

4. The system of claim 1, wherein said at least one base plate is a curved plate.

5. The system of claim 1, wherein said at least one externally actuated mounting plate is a circular sector plate.

6. The system of claim 1, wherein said at least one base plate and said at least one externally actuated mounting plate are integrally constructed.

7. The system of claim 1, wherein said movable gate includes at least one trowel extension, wherein said trowel extension is a planar projection extending from said at least one externally actuated mounting plate.

8. A three dimensional printing system, comprised of: a print head having a discharge aperture for discharge of printing material; a movable gate positionable over said discharge aperture, wherein said moveable gate is externally actuated and selectively positioned to block discharge of said printing material from said discharge aperture when positioned over said discharge aperture, wherein said movable gate is mounted to a sleeve at least partially surrounding said print head.

9. The system of claim 8, wherein said sleeve is rotatable around said print head by an actuator.

\* \* \* \* \*